United States Patent
Röhsner et al.

(10) Patent No.: US 12,229,633 B2
(45) Date of Patent: *Feb. 18, 2025

(54) SECURE PROBABILISTIC ONE-TIME PROGRAM BY QUANTUM STATE DISTRIBUTION

(71) Applicants: UNIVERSITÄT WIEN, Vienna (AT); SINGAPORE UNIVERSITY OF TECHNOLOGY AND DESIGN, Singapore (SG)

(72) Inventors: Marie-Christine Röhsner, Vienna (AT); Philip Walther, Maria Enzersdorf (AT); Tiago Barbin Batalhao, Singapore (SG); Joshua Alexander Kettlewell, Singapore (SG); Joseph Fitzsimons, Singapore (SG)

(73) Assignees: UNIVERSITÄT WIEN, Vienna (AT); SINGAPORE UNIVERSITY OF TECHNOLOGY AND DESIGN, Singapore (SG)

(*) Notice: Subject to any disclaimer, the term of this patent is extended or adjusted under 35 U.S.C. 154(b) by 701 days.

This patent is subject to a terminal disclaimer.

(21) Appl. No.: 17/367,207

(22) Filed: Jul. 2, 2021

(65) Prior Publication Data
US 2021/0334692 A1    Oct. 28, 2021

Related U.S. Application Data

(63) Continuation-in-part of application No. 16/090,012, filed as application No. PCT/EP2017/057538 on Mar. 30, 2017, now Pat. No. 11,057,199.

(30) Foreign Application Priority Data
Mar. 30, 2016    (EP) .................................. 16162886

(51) Int. Cl.
*G06N 10/00*    (2022.01)
*G06F 15/16*    (2006.01)
(Continued)

(52) U.S. Cl.
CPC ............. *G06N 10/00* (2019.01); *G06F 15/16* (2013.01); *G06N 10/20* (2022.01); *G06N 10/40* (2022.01)

(58) Field of Classification Search
None
See application file for complete search history.

(56) References Cited

U.S. PATENT DOCUMENTS 7,649,996 B2 * 1/2010 Nishioka ............... H04L 9/0858
                                                          380/255
8,897,449 B1   11/2014 Broadbent
(Continued)

FOREIGN PATENT DOCUMENTS

CA       2882288 A1 *  3/2014  ........... H04B 10/501
CN     101189627 A  *  5/2008  ............ B82Y 10/00
(Continued)

OTHER PUBLICATIONS

Robin Blume-Kohout (Optimal, reliable estimation of quantum states); p. 26; Published Apr. 20 (Year: 2010).*
(Continued)

*Primary Examiner* — Eleni A Shiferaw
*Assistant Examiner* — Ali H. Cheema
(74) *Attorney, Agent, or Firm* — McCoy Russell LLP (57) ABSTRACT

Method and system for executing a one-time program comprising at least one instruction operating on at least one input value (a, b) and returning at least one output value (O), wherein each instruction of the one-time program is encoded onto a state of an elementary quantum system, comprising: encoding the at least one input value (a, b) onto a quantum
(Continued)

gate according to a pre-defined input-encoding scheme; applying the quantum gate to the at least one elementary quantum system; making a measurement of a resulting state of the at least one elementary quantum system after the quantum gate; and determining the at least one output value from a result of the measurement.

23 Claims, 5 Drawing Sheets (51) Int. Cl.
*G06N 10/20* (2022.01)
*G06N 10/40* (2022.01)

(56) References Cited

U.S. PATENT DOCUMENTS

| | | | | |
|---|---|---|---|---|
| 2002/0097874 | A1* | 7/2002 | Foden | H04L 9/0858 380/256 |
| 2004/0042715 | A1* | 3/2004 | Linden | H04L 27/00 385/31 |
| 2004/0078421 | A1 | 4/2004 | Routt | |
| 2004/0109633 | A1 | 6/2004 | Pittman et al. | |
| 2005/0036624 | A1* | 2/2005 | Kent | H04L 9/0858 380/277 |
| 2005/0182614 | A1* | 8/2005 | Meredith | B82Y 10/00 257/14 |
| 2006/0056631 | A1* | 3/2006 | Beausoleil | H04B 10/70 380/256 |
| 2008/0310000 | A1* | 12/2008 | Beausoleil, Jr. | B82Y 10/00 359/279 |
| 2009/0109633 | A1 | 4/2009 | Rajala et al. | |
| 2009/0225873 | A1 | 9/2009 | Lee et al. | |
| 2010/0079833 | A1 | 4/2010 | Langford et al. | |
| 2010/0251049 | A1* | 9/2010 | Goto | H04L 9/0858 714/E11.032 |
| 2010/0265077 | A1* | 10/2010 | Humble | G08B 13/186 340/600 |
| 2011/0280405 | A1* | 11/2011 | Habif | H04B 10/70 380/278 |
| 2013/0016835 | A1 | 1/2013 | Zbinden et al. | |
| 2014/0126030 | A1* | 5/2014 | Crespi | G02F 3/00 359/108 |
| 2014/0201591 | A1* | 7/2014 | Ashikhmin | B82Y 10/00 714/758 |
| 2014/0289583 | A1* | 9/2014 | Goto | H03M 13/41 714/752 |
| 2014/0354326 | A1 | 12/2014 | Bonderson et al. | |
| 2015/0055961 | A1* | 2/2015 | Meyers | G06N 10/00 398/140 |
| 2015/0200778 | A1* | 7/2015 | Shi | G06F 7/588 380/46 |
| 2015/0354938 | A1 | 12/2015 | Mower et al. | |
| 2017/0230050 | A1* | 8/2017 | Rigetti | G06N 10/00 |
| 2018/0041743 | A1* | 2/2018 | Ellwood, Jr. | H04N 3/14 |
| 2019/0049495 | A1 | 2/2019 | Ofek et al. | |
| 2020/0274541 | A1 | 8/2020 | Hincks et al. | |

FOREIGN PATENT DOCUMENTS

| | | | |
|---|---|---|---|
| JP | 2008275673 A | * | 11/2008 |
| RU | 2325039 C2 | * | 5/2008 |

OTHER PUBLICATIONS

Ramon van Handel, John K. Stockton, and Hideo Mabuchi; (Feedback Control of Quantum State Reduction); p. 13; Published on IEEE June (Year: 2005).*
Zhongzhong Qin, Adarsh S Prasad, Travis Brannan, Andrew MacRae, A Lezama and Al Lvovsky; (Complete temporal characterization of a single photon); p. 6; Published on Jun. 5 (Year: 2015).*
F.W.Sun, B. H. Liu, Y. F. Huang, Y. S. Zhang, Z. Y. Ou and G. C. Guo; (Entanglement and interference between different degrees of freedom of photon states); p. 6; Published on Dec. 11 (Year: 2007).*
Selinger, P., "Towards a Quantum Programming," Math Structures in Computer Science, vol. 14, No. 4, Aug. 5, 2004, 28 pages.
Van Handel, R. et al., "Feedback Control of Quantum State Reduction," IEEE Transactions on Automatic Control, vol. 50, No. 6, Jun. 2005, 13 pages.
Gay, S. et al., "Probabilistic Model-Checking of Quantum Protocols," Cornell University Library Website, Available Online at https://arxiv.org/abs/quant-ph/0504007, Oct. 5, 2005, 17 pages.
Aaronson, S., "Quantum Copy-Protection and Quantum Money," Proceedings of the 2009 24th Annual IEEE Conference on Computational Complexity, Jul. 15, 2009, Paris, France, 14 pages.
Broadbent, A. et al., "Quantum one-time programs," Proceedings of the 33rd Annual Cryptology Conference, Aug. 18, 2013, Available Online Nov. 6, 2012, Santa Barbara, California, 62 pages.
ISA European Patent Office, International Search Report Issued in Application No. PCT/EP2017/057538, May 10, 2017, WIPO, 3 pages.

* cited by examiner

SECURE PROBABILISTIC ONE-TIME PROGRAM BY QUANTUM STATE DISTRIBUTION

CROSS-REFERENCE TO RELATED APPLICATIONS

The present application is a continuation of U.S. Non-Provisional patent application Ser. No. 16/090,012 entitled, "SECURE PROBABILISTIC ONE-TIME PROGRAM BY QUANTUM STATE DISTRIBUTION," filed on Sep. 28, 2018. U.S. Non-Provisional patent application Ser. No. 16/090,012 is a U.S. National Phase of International Patent Application No. PCT/EP2017/057538 filed on Mar. 30, 2017. International Patent Application No. PCT/EP2017/057538 claims priority to European Patent Application No. 16162886.2, filed on Mar. 30, 2016. The entire contents of each of the above-listed applications are hereby incorporated by reference for all purposes.

TECHNICAL FIELD

The invention concerns an application of quantum technology to the field of information security, in particular to the security of an executable algorithm in the form of a one-time program.

BACKGROUND

In the present context a one-time program is defined as a program that can be executed once and only once, with a bounded error probability, and that comprises at least one instruction operating on at least one input value and returning at least one output value. Here the term instruction is used to refer to a "step" or operation of a program. An instruction essentially constitutes a time unit of the program. In classical computing the instructions used in a program to be executed on a microprocessor are defined by the instruction set of the microprocessor. There is no general limitation to the type of operation performed. For instance an instruction may comprise any number of logical operations. The bounded error probability mentioned above provides for the fact that a practical one-time program as referred to in the present application is in fact not ideal, in the sense that it is not error-free, but rather a "probabilistic one-time program". I.e. there is a limited probability that the one-time program has an error. Therefore in practice error correction may be applied to detect and/or correct errors during or after program execution in order to decrease the probability of an erroneous program output.

The present invention is based on the insight that the security of a one-time program can be improved by harnessing the implications of the No-Cloning-Theorem (i.e. no arbitrary quantum state can be perfectly cloned). Specifically, the invention aims at providing an apparatus and method for the handling of one-time programs such that the execution of the program alters the program itself in an irreversible fashion.

The peculiar properties of the states of elementary quantum systems (in short "quantum states") have already been used in different applications. The most prominent example perhaps is the general field of quantum cryptography. Within this field, quantum communication, i.e. the transmission of quantum states for establishing a channel having advantageous security properties, is closest to commercialisation. Due to present practical/technological limitations concerning the rate of transmitted states, such communication often serves as an "off-the-record" channel, e.g. for exchanging encryption details, alongside a classical communication channel for transmitting the (encrypted) data stream or "payload".

Among the more recent documents in this field, US 2015/0222619 A1 documents the principles of some of the more widespread applications, including Quantum Key Distribution (QKD) as outlined above and specifically concerns a Quantum Identification Protocol (QIP).

The present applications of quantum technology for information security are all based on some kind of randomization during preparation of a state carrying information and some kind of subsequent information exchange concerning the actual realization used during preparation. In other words, the information to be exchanged over the quantum channel is encoded onto the quantum states using a random—ideally unpredictable—encoding scheme. Consequently, an observation of the prepared states in itself does not allow to use, much less derive, the encoded information. However, once the encoded information has been reconstructed from the observed states (e.g. using information concerning the preparation of the states), the obtained information obviously is no longer protected and thus can be used and distributed freely.

Another application of quantum technology for information security under active research concerns the topic of "quantum money". This field concerns the problem of providing information that can be varied but not copied (similar to a banknote). The article "Quantum Copy-Protection and Quantum Money" by Scott Aaronson (July 2009. 24th Annual IEEE Conference on Computational Complexity. IEEE.) discloses a method for providing a copy-protected point function $f_s(x)$, i.e. a function returning the equality of an input value x and a secret s. The secret s is kept by a vendor (e.g. a bank), which prepares a state $\psi_s$. Although the customer can compute the value of the point function for any x by consuming the state $\psi_s$, Aaronson shows that there is no polynomial-time quantum algorithm for preparing a copy of $\psi_s$, i.e. the secret s is computationally secure. At the same time Aaronson explicitly states information-theoretic security (as provided, for example, by quantum key distribution) as infeasible for quantum copy-protection and publicly-verifiable quantum money. This conclusion is based on the premise underlying the entire article that the vendor provides multiple (perhaps unlimited) copies of $\psi_s$. In other words, the point function can be computed as often as desired and therefore does not constitute a one-time program.

Finally the article "Quantum One-Time Programs" by Broadbent Anne el at (Advances in Cryptology—Proc. CRYPTO 2013, LNCS vol. 8043, pp. 344-360, Springer) discloses different protocols for Quantum One-Time Programs. One significant disadvantage of these protocols is that all of them require entangled quantum systems for conveying the input and output values. Moreover the article only studies quantum one-time programs under the assumption of single bit one time memories. These are known to be impossible to ideally construct—thus the article can be only of hypothetical nature.

An object of the present invention is to provide an apparatus and method for executing a one-time program such that each copy of the one-time program should be executable once and only once, with a limited error probability.

This object is achieved with a method according to claim 1 and a system according to claim 20.

The present invention concerns a method as well as a system for executing a one-time program as defined in the outset. The method according to the present invention comprises the following steps for each instruction of the one-time program:

receiving at least one elementary quantum system, wherein a state of the elementary quantum system represents the instruction according to a pre-defined program-encoding scheme;

encoding the at least one input value onto a quantum gate according to a pre-defined input-encoding scheme;

applying the quantum gate to the at least one elementary quantum system;

making a measurement of a resulting state of the at least one elementary quantum system after the quantum gate; and determining the at least one output value from a result of the measurement.

The elementary quantum system or each of the elementary quantum systems may be any ideal (e.g. single particle) or non-ideal (e.g. weak coherent state) elementary quantum system, which has at least two orthogonal eigenstates. In general one or more elementary quantum system can be used to represent one instruction of the one-time program. If for example two or more elementary quantum systems represent a single instruction, the state representing the instruction is a combined state of the two or more elementary quantum systems; i.e. each single elementary quantum system in this case contributes only a partial representation of the instruction. For the purpose of this disclosure, the term "encoding scheme" refers to a—usually unique and unambiguous—mapping between one representation of some information (e.g. data or instruction) and another. The program-encoding scheme thus defines for every instruction of the program according to a limited instruction set a corresponding state of the at least one elementary quantum system. Thus, the elementary quantum system(s) can be prepared to represent the respective instruction. Consequently the program-encoding scheme defines the instruction set for the one-time program. Similarly the input-encoding scheme defines for every input value according to a limited set of valid inputs a corresponding quantum gate. The term quantum gate here denotes a reversible operation that can be performed on a quantum state, i.e. on a state of the elementary quantum system(s), and in general (but not always) modifies the quantum state it acts upon. With respect to the encoding schemes it is important to note that both encoding schemes are pre-defined and that they are dependent on each other. A change in the program-encoding scheme generally requires an adjustment of the input-encoding scheme and vice versa. The quantum gate defines the measurement basis for the elementary quantum system(s). This choice of measurement basis corresponds to the encoding of the input values. Therefore, the number of inputs defines the number of necessary bases.

The states of the elementary quantum system(s) which encode the instruction(s) of the program are chosen such that all of them project to the desired outcome with equal probability and independent of the input (i.e. measurement basis). To make this possible non-orthogonal states are used to encode the input. Once those bases have been chosen (which can be adapted to the technical requirements of the implementation) the states used in the program-encoding scheme are chosen such that they fulfil the described requirements. The program-encoding scheme and the input-encoding scheme are coordinated such that the at least one output value determined from the result of the measurement corresponds to the output value that can be obtained by applying the logic gate to the at least one input value.

Put in more practical terms, the described encoding of the input value, application of the resulting quantum gate and subsequent measurement corresponds to a choice of an analysis measurement depending on an input value to the one-time program. The measurement properties (the "analysis") are defined by the quantum gate, which in turn is defined by the input value(s).

Correspondingly the system according to the present invention comprises:

a receiver for receiving at least one elementary quantum system representing an instruction according to a pre-defined program-encoding scheme;

an encoder for encoding the at least one input value onto a quantum gate according to a pre-defined input-encoding scheme;

a quantum device connected to the encoder and configured to apply the quantum gate to the at least one elementary quantum system;

a measurement unit performing a measurement of a resulting state of the at least one elementary quantum system leaving the quantum device; and a post-processor connected to the measurement unit and configured to determine the at least one output value from a result of the measurement.

Here the receiver can essentially be a channel or container transporting or holding the elementary quantum system; i.e. the term "receiving" does not imply any modification of the quantum state, in particular the receiver does not measure the quantum state. The encoder receives the at least one input value and chooses the corresponding configuration for a quantum gate according to the input-encoding scheme. The term "quantum device" refers to the physical implementation of the quantum gate, i.e. the device acting as the quantum gate determined by the encoder. The measurement unit is the physical device making the measurement, i.e. changing the quantum state to a classical state and thus providing the measurement output, e.g. as an electrical or digital signal. The post-processor interprets the measurement as an output value of the instruction. For instance the post-processor may decode the output of the measurement unit based on an output-decoding scheme. The post-processor may also perform sanity checks of the measurement results.

Preferably the present method is a method for executing a one-time program comprising at least two instructions, characterised by executing the one-time program sequentially. Executing the one-time program sequentially means that the one-time program is executed one instruction at a time, until the sequence of instructions of the program ends. E.g. a second instruction is executed after a first instruction and so on until the last instruction.

In this context it can be advantageous if the method comprises encoding the at least one input value of a second instruction onto the quantum gate after, preferably immediately after, determining the at least one output value of a first instruction. This allows for sequences of interconnected instructions.

Correspondingly, the measurement unit or the post-processor of the present apparatus may be connected to the input encoder over an internal trigger channel and configured to notify the input encoder of the reception of an elementary quantum system or an instruction. The notification enables timely proceeding with a second or subsequent instruction after the elementary quantum system, the state of which encodes a first instruction, has been received. This allows a natural synchronisation with a program provider preparing the one-time program by encoding subsequent instructions on subsequently emitted elementary quantum systems (see below).

In a preferred embodiment of the present method, the input value of a second instruction depends on the output value of a first instruction. In practice that means that for this embodiment the method of evaluating a certain gate is generally dependent on the outcome of the output of previous gates. This does not mean that the encoding must change dependent on the output of previous gates. It follow naturally from the above dependency, that the instructions are executed sequentially in order to fulfil any potential dependencies in the given order and sequence of instructions.

Each elementary quantum system may optionally be an ensemble of weakly coherent photons or a single photon. The use of photons as elementary quantum systems entails the advantage of comparatively easy transmission through presently available communication lines, e.g. optical fibres and free space. Using a single photon per instruction further has the advantage that the security of the one-time program would be further improved, e.g. against photon-number splitting (PNS) attacks.

The pre-defined state and the resulting state may be states in one or more degrees of freedom including polarization, spatial, temporal and frequency.

The encoding optionally comprises modifying at least one member selected from a group consisting of: polarization characteristics, spatial characteristics, temporal characteristics, and frequency characteristics, of the at least one ensemble of weakly coherent photons or of the at least one single photon provided by the program sending device in a pre-defined state.

When each elementary quantum system is a photon or an ensemble of photons, the instruction may be represented by the polarization state of the photon(s) and the quantum gate may operate on the polarization state and the measurement may comprise the detection of the direction of polarization of the single photon, wherein the at least one output value may be determined based on the detected direction. For example, the instruction can be represented by the polarization state of one, two, three or more single photons (generally a larger instruction, i.e. a gate acting on a larger number of input values or bits, will require more photons). The use of polarization states of photons for encoding information has the advantage that it does not significantly influence the transmission properties of the photon(s) (as opposed to e.g. its wavelength) and polarization states are relatively easy to manipulate. For example, the polarization may be detected e.g. by using a polarizing beam splitter (PBS) and two single-photon detectors, one for each output path of the PBS. In this configuration every single incoming photon can be detected irrespectively of the measurement outcome and the successful transmission can be confirmed.

According to another exemplary embodiment, when each elementary quantum system is a photon or an ensemble of photons, the instruction may be represented by a temporal state of the photon(s), for example according to a time-bin encoding scheme. This has the advantage that is allow for longer traveling times of the resulting state as time is more stable over fiber than e.g. polarization. The temporal state encoding may be implemented by combining the polarization encoding scheme disclosed below in detail with a polarization/time-bin conversion scheme as disclosed by Bussières et al in their article "Testing nonlocality over 12.4 km of underground fiber with universal time-bin qubit analyzers", Physical Review A 81.5 (2010): 052106. At the receiver, the time-bin encoding may be reversed to polarization encoding and then evaluated as discussed in the present disclosure. Alternatively, the input-encoding scheme and the quantum gate may be devised to operate directly on the time-bin encoded states of the elementary quantum system. Also, the measurement can in principle act on the resulting time-bin state after the quantum gate.

In general, a change between degrees of freedom (that is, polarisation, time-bin, frequency and spatial modes) is well understood and there exist standard optical setups for achieving this. The present disclosure is not limited to one particular type of encoding nor one particular photon degree of freedom. Any degree of freedom, in particular of single photons or ensembles of weakly coherent photons, can be the basis for the pre-defined program-encoding scheme and optionally also for the pre-defined input-encoding scheme.

When each elementary quantum system is a photon or an ensemble of photons, the quantum gate can be implemented by at least one phase retarder, wherein the input-encoding scheme determines the setting or configuration of the phase retarder corresponding to the at least one input value. The at least one phase retarder can preferably be a half- or quarter-waveplate, but also an electro-optical modulator (e.g. a Pockels cell), a liquid crystal retarder, a Faraday rotator, or a Prism retarder. When more than one elementary quantum system is used (e.g. two or more individual photons), the quantum gate corresponds to the set of configurations addressing each of the photons individually using one or more phase retarders.

Correspondingly, the quantum device of the present system may comprise at least one configurable phase retarder (e.g. a rotatable waveplate) connected with the encoder, such that the setting of the phase retarder (e.g. the rotation of the waveplate) is controlled depending on the at least one input value, and the measurement unit may comprise at least one detector capable of detecting a single photon.

When only one elementary quantum system per instruction is used, i.e. each instruction is represented by the state of a single elementary quantum system, a classical 1-bit gate can be realized. There are four possible 1-bit gates: constant zero (yielding the output value zero/0 for any input value), constant one (yielding the output value one/1 for any input value), identity (yielding an output value identical to the given input value) and flip (yielding an output value obtained from the negation of the given input value).

Each instruction may be represented by at least two elementary quantum systems. When each instruction is represented by two elementary quantum systems, the size of the instruction set is correspondingly squared compared to the case of a single elementary quantum system. Generally, increasing the number of quantum systems allows an increase in the size of the instruction set. When each instruction is represented by at least two elementary quantum systems, the at least two quantum gates encoding the at least one input value are preferably chosen from a set of quantum gates having no pair of commuting quantum gates between them. In this case the measurements are not separable and the security of the protocol is significantly improved, because only one computational path, i.e. only one input value, may be evaluated (with maximum possible probability) for each pair of elementary quantum systems.

Moreover the at least one output value is preferably determined from the result of the measurement of the resulting states of the at least two elementary quantum systems using at least one logical exclusive-or (XOR) gate or at least one logical exclusive-not-or (XNOR) gate, optionally together with one or more of the at least one input value(s). In other words, the measurement of the resulting states of the at least two elementary quantum systems as well as zero or more input value(s), i.e. zero or more of the at least one input value(s), is possibly used in determining the at least one output value. Preferably at least one logical exclusive-or gate or at least one logical exclusive-not-or gate is used in determining the output value in the above-described manner. This enforces a logical connective between independent measurements of the at least two quantum states.

To mitigate the risk of re-send attacks by a dishonest user, it has proven advantageous if for determining the at least one output value from a result of the measurement the result is modified depending on a clearance value received over a classical channel, e.g. electronically, after confirming the safe reception of the elementary quantum system. The clearance value may be a flip bit, which has to be combined in a XOR (or XNOR) operation with the preliminary output value determined from the measurement result(s).

The present invention also concerns a method for preparing a one-time program for execution according to the method described above, based on a conventional program comprising at least one instruction operating on at least one input value and returning at least one output value, comprising the following steps preceding the execution:
  providing at least one elementary quantum system in a pre-defined state;
  encoding the at least one instruction of the conventional program onto the state of the at least one elementary quantum system according to the program-encoding scheme;
  transmitting the resulting state of the at least one elementary quantum system for execution.

The elementary quantum system is initially provided in a pre-defined and known state. This known state is subsequently modified in a well-defined fashion in order to bring the elementary quantum system into a (possibly different) prepared state. Hence, the initial state is converted to the desired prepared state. The prepared state is determined by the program-encoding scheme as discussed above and the instruction of the conventional program, to which the encoding scheme is applied. In other words, the elementary quantum system is subjected to a change in its physical state, such that the prepared state is obtained from the known state.

Preferably the at least one instruction may be encoded onto two or more elementary quantum systems, wherein during encoding each elementary quantum system is manipulated separately and contributes only a specific partial representation of the instruction. In this context separate manipulations means that the elementary quantum system will in general assume different states after preparation, i.e. groups of two or more elementary quantum systems being prepared together (and therefore being guaranteed to share the same state) should be avoided. Generally the number of elementary quantum systems encoding a single instruction is strictly limited and predefined by the program-encoding scheme. A specific partial representation of the instruction is a partial representation specific to any one elementary quantum system. Of course it is still possible that multiple elementary quantum systems assume the same state, where this combination is not purely redundant but encodes additional information (similar to two binary bits having the state "1", where the combination of both may encode the 2-bit value "3" and not merely two copies of "1").

Moreover the present method may be suitable for preparing a one-time program based on a conventional program comprising at least two instructions, characterised by following the sequence of instructions in the conventional program and encoding each instruction sequentially. Thus a corresponding sequence of elementary quantum systems will be transmitted, allowing for sequential execution of the one-time program at the receiver.

In order to avoid multiple copies of any single state, the present method may be characterized in that, after transmission of a first elementary quantum system, preparing the encoding of a second elementary quantum system. In this way the same encoding will not be re-used and the probability of copies of the first elementary quantum system is minimized. Preferably the encoding of the second elementary quantum system (or, generally, the respective subsequent elementary quantum system), is prepared immediately after the first elementary quantum system is transmitted, where "immediately" means that the time span until the preparation of the encoding is finished is small compared to the time span between the generation of two subsequent elementary quantum systems (e.g. less than $1/10$th, preferably less than $1/100$th, thereof).

When each elementary quantum system is a photon or an ensemble of photons, the at least one ensemble of weakly coherent photons or at least one single photon is preferably provided having a pre-determined polarization, and the at least one instruction of the conventional program is encoded on the polarization state of the at least one single photon. Single photons having a pre-determined polarization may be obtained from an appropriate single-photon source, e.g. based on spontaneous parametric down-conversion (SPDC source). The prepared state may be achieved by applying a suitable rotation to the polarization, e.g. by means of a half-wave plate and/or a quarter-wave plate. The at least one ensemble of weakly coherent photons or at least one single photon is preferably provided having a state pre-determined in one or more degrees of freedom including polarization, spatial, temporal and frequency, and the at least one instruction of the classical program may be encoded on said one or more degrees of freedom of the ensembles of weakly coherent photons or of the single photons. Generally, all of those quantities or degrees of freedom may be pre-determined and one or more may carry information, meaning that those one or more may be used to encode the at least one instruction of the classical program, while the others remain fixed and independent of the encoding, but can still be pre-determined.

In the case of the above-described application of a clearance value, for preparation of the one-time program the clearance value can be randomly generated and the encoding of the at least one instruction of the conventional program onto the state of the at least one elementary quantum system can be modified according to the clearance value, and the clearance value will be transmitted only after the safe reception of the elementary quantum system for execution has been confirmed.

Correspondingly, the system for preparing and executing a one-time program as described above may further comprise: a photon source configured to emit single photons having a predetermined polarization; and a preparation unit comprising at least one configurable phase retarder for preparing the polarization state of photons emitted by the photon source; the photon source and the preparation unit being connected to a program-encoding unit, which is configured to control the configuration of the at least one phase retarder of the preparation unit depending on the instructions of a provided program using a pre-defined input-encoding scheme.

In a preferred embodiment of the above apparatus it may be configured for preparing and executing a one-time program comprising at least two instructions, wherein the program-encoding unit is configured to receive a notification of the emission of a single photon by the photon source and to proceed to the next instruction of the provided program upon reception of the notification. This ensures that no fully redundant copies of elementary quantum systems are created and thereby improves the security of the performed transmission.

The present invention is especially advantageous in an application where a first party (the program provider, sender or vendor) owns a program and wants to control the number of executions of this program by other parties (the program users or receiver). This situation is presently solved by providing software as a service (SaaS), wherein the execution of the program is performed on infrastructure controlled by the software vendor. When the other parties, who intend to execute the program of the first party, do not wish to divulge their input values (e.g. input data) to the first party, the interests of both parties may be solved by an escrow solution ("software as a service data escrow"), wherein an independent party receives the program and the data, executes the program and provides the output data. Presently, such solutions are based on legal principles and contracts. As such they provide no guarantee against leaks of either the program or the data or both. The present invention essentially implements a physical SaaS data escrow in that the user of the one-time program, who performs the above method for executing the program, does not obtain enough information to reconstruct the program and the provider of the one-time program, who performs the above method for preparing the one-time program, does not obtain any information about the input data applied by the user.

BRIEF DESCRIPTION OF THE FIGURES

Referring now to the drawings, wherein the figures are for purposes of illustrating the present invention and not for purposes of limiting the same.

DETAILED DESCRIPTION

Figure 1:
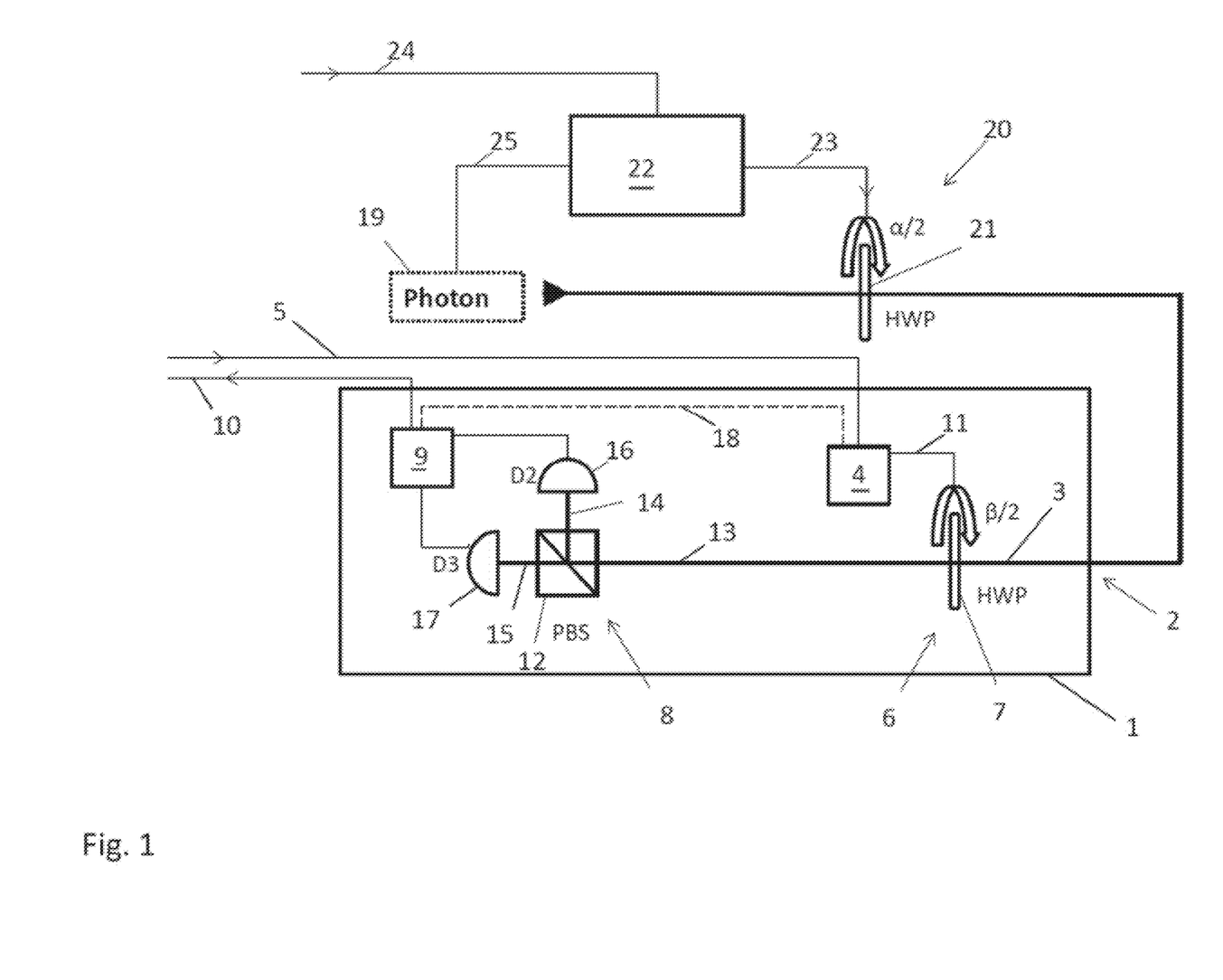
FIG. 1 shows a simplified first embodiment of the present invention, wherein each instruction of the one-time program is encoded onto a linear polarization of one single photon.

FIG. 1 schematically shows the set-up of a first embodiment of the invention comprising an apparatus 1 for executing a one-time program. Apparatus 1 comprises a receiver 2 in the form of a program channel 3, an input encoder 4 connected to an input channel 5, a quantum device 6 comprising a configurable phase retarder in the form of a half-wave plate (HWP) 7 connected to the input encoder 4, a measurement unit 8, a post-processor 9 connected to the measurement unit 8 and an output channel 10.

Apparatus 1 is configured to receive photons over program channel 3, which comprises a light path preferably being formed by an optical waveguide, by an air gap, by an optical fiber or by other means transparent to photons. Apparatus 1 receives one or more input values to the program over input channel 5, which preferably is an electrical channel, preferably providing a data connection and interface to the input encoder 4. The input encoder 4 is connected to the half-wave plate 7 over a control channel 11. The half-wave plate 7 is an electronically switchable waveplate, e.g. made of liquid crystals, ferro-electric liquid crystals, or magneto-optic crystals, configured to rotate the polarization of transmitted photons by a configurable angle (3, wherein the configuration can be controlled electronically. The input encoder 4 stores or has access to an input-encoding scheme, which is used to determine the configuration of the HWP 7 based on the input value received over the input channel 5.

After a photon has been received by the receiver 2 and transmitted through the HWP 7, it is incident upon the measurement unit 8. The measurement unit 8 comprises a polarizing beam splitter (PBS) 12, which splits the incident light path 13 into two outgoing lights paths 14, 15. As is well-known per se, the path 14, 15 taken by any single photon depends on its linear polarization relative to the PBS 12. Each outgoing light path 14, 15 terminates at a respective detector 16, 17. The detectors 16, 17 are preferably single-photon detectors, e.g. photomultipliers (PMs) or avalanche photodiodes (APDs). The detectors 16, 17 emit an electrical signal when the presence of a photon is detected. The electrical signal is transmitted to the post-processor 9, which evaluates the measurement outcome, i.e. the obtained polarization state of linear polarization, based on the source of each received signal. Based on the measured outcome of the quantum state the post-processor determines the output value of the instruction represented by the received photon, e.g. based on a pre-defined output-decoding scheme.

The one-time program is executed by apparatus 1 sequentially, i.e. one instruction at a time. In particular, the HWP 7 implements one defined quantum gate at any given point in time and thus represents the input value to a single instruction. The execution of an instruction starts with the preparation of the quantum device 6. Specifically, the input encoder 4 determines the rotation angle β/2 of the HWP 7 encoding the input value for the present instruction and thereafter instructs the HWP 7 over the control channel 11 to apply this angle β/2. When the HWP 7 has processed this instruction, it is configured to apply the quantum gate (i.e. the polarization rotation operation about a specified angle) to a photon subsequently transmitted. Next, apparatus 1 waits for the photon having a polarization state encoding the present instruction of the one-time program. When the photon arrives, it is transmitted through the HWP 7, which applies the quantum gate, e.g. by modifying the polarization state of the photon. After the HWP 7 (seen in direction of the photon path) the photon arrives at the measurement unit 8 which measures the resulting quantum state of the photon after the HWP 7. At the PBS 12, the polarization state collapses to one of the two linear polarization states transmitted or reflected by the PBS 12, e.g. to either vertical or horizontal linear polarization. Subsequently, depending on which state is occupied, one of the two detectors 16, 17 is triggered and the post-processor 9 receives the signal carrying the information about the measured polarization state of the photon. From this information the post-processor 9 determines the output value of the present instruction.

Figure 2:
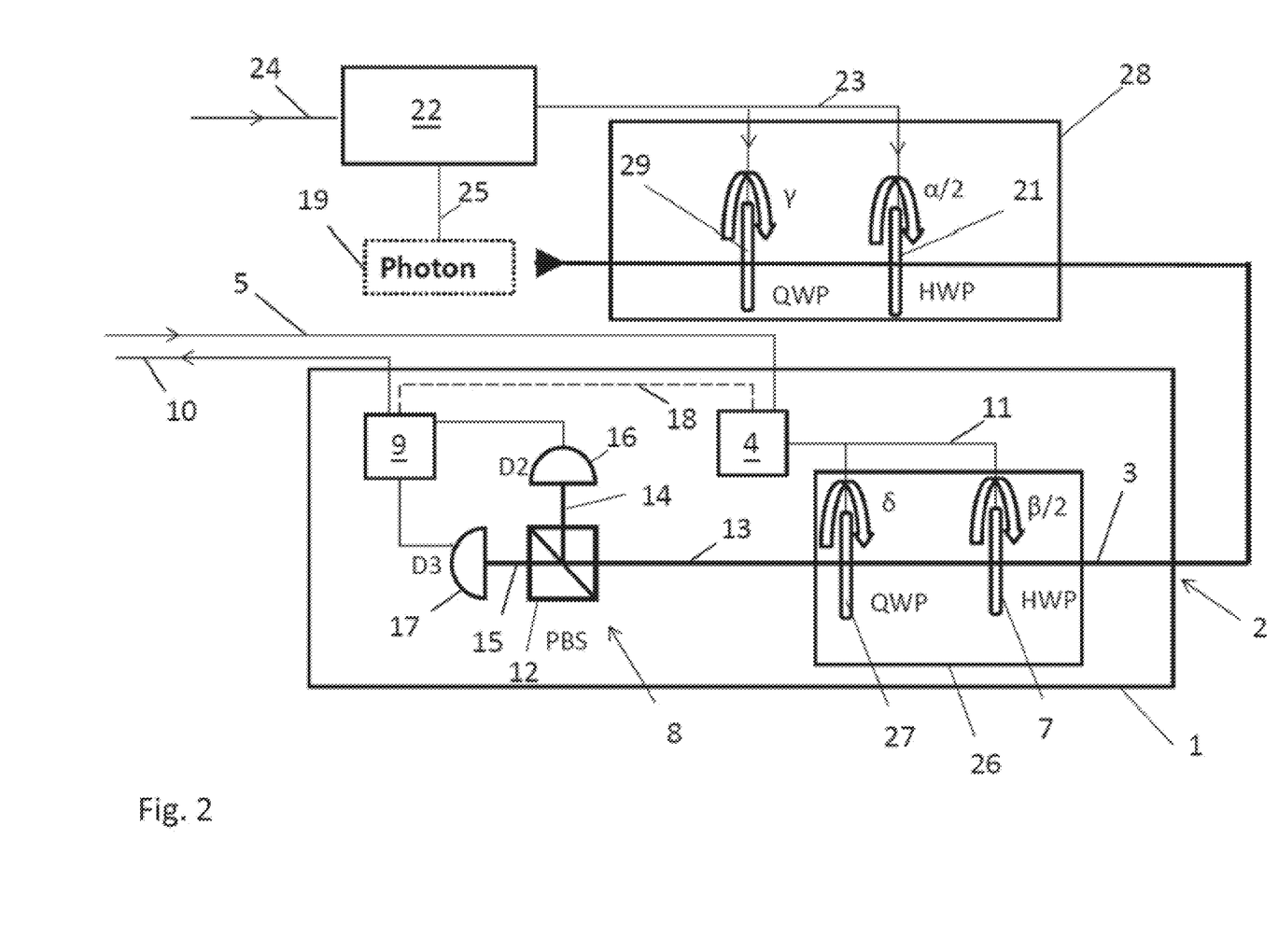
FIG. 2 shows a simplified second embodiment of the present invention, wherein each instruction of the one-time program is encoded onto linear and elliptical polarizations of two single photons.

The post-processor 9 preferably is connected to the input encoder 4 over an internal trigger channel 18, as shown by dotted lines in FIGS. 1, 2. When the post-processor 9 recognizes the reception of a photon, it notifies the input encoder 4 that the present instruction has been received. Subsequent to this notification, the input encoder 4 is ready to prepare the quantum device 6 for applying a quantum gate corresponding to the input value(s) of the next instruction of the one-time program until a final result of the one-time program is obtained, i.e. the sequence of instructions of the program has been completed. 1 further schematically shows the preparation of the photon representing an instruction of the one-time program prior to its execution. The photon is first emitted by a photon source 19. The photon source 19 preferably is based on an SPDC process yielding a pair of photons each having a well-defined (and known) polarization. One of the two photons is then used as a heralding photon to notify the sender of the emission of the second photon. This second photon having a certain predetermined polarization state, e.g. linear vertical polarization, is transmitted to a preparation unit 20. The preparation unit 20 comprises a rotatable sender HWP 21, which preferably is of identical construction as HWP 7 used by the apparatus 1 for executing the one-time program. The configuration of the sender HWP 21, e.g. the angle α of rotation of the polarization of a transmitted photon, is controlled by a program-encoding unit (PEU) 22 over a control channel 23. The PEU 22 selects the configuration based on the instructions of the program provided over a program input channel 24 to the PEU 22. In case of a simple sequential encoding it follows the sequence of instructions in the received (conventional) program and encodes the present instruction according to a pre-defined program-encoding scheme, which is implemented in the program-encoding unit 22 or to which the PEU 22 has access. In the present example the PEU 22 determines the angle α corresponding to the present instruction and commands the sender HWP 21 to apply the configuration necessary to cause a rotation of polarization about the angle α by setting the HWP 21 to an angle of α/2. Then, the PEU 22 waits until it is notified over a trigger channel 25 of the emission of a single photon by the photon source 19. When the notification is received, the PEU 22 proceeds to the next instruction of the program and proceeds as above until the program has been fully processed.

The functioning of the arrangement shown in FIG. 1 will be more fully understood by assuming a simple example for the encoding schemes. Since the elementary quantum system is a photon and the quantum device 6 is a HWP 7, there is a single degree of freedom for encoding the input values, i.e. the angle of linear polarization of the photon. Correspondingly, there is a single degree of freedom for the sender. In the program-encoding scheme used in this simple example, the instruction set of the provided conventional program contains the following 1-bit logical gates as defined earlier: constant zero, constant one, identity and flip (or "not"). Each instruction operates on one input value, which can take the logical values zero (0) or one (1), and returns one output value, which can also take the logical values zero (0) or one (1).

The program-encoding scheme is defined as follows:

| instruction | quantum state | HWP angle α/2 (starting from vertical polarization) |
|---|---|---|
| constant zero | $\|C_0\rangle = \frac{1}{\sqrt{2+\sqrt{2}}}(\|0\rangle+\|+\rangle)$ | 56.25° |
| constant one | $\|C_1\rangle = \frac{1}{\sqrt{2+\sqrt{2}}}(\|1\rangle-\|-\rangle)$ | 11.25° |
| identity | $\|C_{Id}\rangle = \frac{1}{\sqrt{2+\sqrt{2}}}(\|0\rangle+\|-\rangle)$ | 33.75° |
| flip | $\|C_{NOT}\rangle = \frac{1}{\sqrt{2+\sqrt{2}}}(\|1\rangle+\|+\rangle)$ | 78.75° | where $|0\rangle$ is implemented as a horizontally polarized photon and $|1\rangle$ is implemented as a vertically polarized photon; and where $|+\rangle$ and $|-\rangle$ are defined as:

$$|+\rangle = \frac{1}{\sqrt{2}}(|0\rangle+|1\rangle) \text{ and } |-\rangle = \frac{1}{\sqrt{2}}(|0\rangle-|1\rangle)$$

respectively.

The input-encoding scheme is defined as follows:

| input value | quantum gate (measurement basis) | HWP angle β/2 |
|---|---|---|
| zero (0) | Z | 0° |
| one (1) | X | 22.5° | where "Z" denotes a measurement in the Pauli-Z basis, i.e. in the basis with eigenstates $|0\rangle$ and $|1\rangle$ as defined above, and "X" denotes a measurement in the Pauli-X basis, i.e. in the basis with eigenstates $|+\rangle$ and $|-\rangle$ as defined above.

The output-decoding scheme is that the output value is zero (0) when the photon is transmitted through the PBS 12 and detector 17 is triggered; and the output value is one (1) when the photon is reflected in the PBS 12 detector 16 is triggered.

In case a larger instruction set is desired, the above-described method of operation of the apparatus shown in FIG. 1 can be extended to more than one elementary quantum system per instruction. At the same time this allows for a corresponding higher number of input values. Of particular interest is an instruction set implementing 2-bit logical gates, which are ubiquitous in present computing algorithms. A 2-bit logical gate takes two input values and returns one output value. Common examples are the logical operations AND, OR and XOR. In total there are 16 possible 2-bit logical gates. The construction of all the 2-bit gates trivially leads to the possibility of arbitrary computation.

When two photons are used to encode each instruction, this would allow for two logical input values corresponding to a duplication of the above input-encoding scheme. Moreover, the original instruction set size (4) would be squared, leading to an instruction set with 16 possible entries and thus allowing for the encoding of any possible 2-bit gate. However, this approach has the disadvantage that the information obtained by the user would be two output values, i.e. more than a single output value. This can be exploited to obtain information about the program independent of the provided input values. In order to avoid this drawback, an input-encoding scheme must be found that comprises four quantum gates, such that for each possible pair of quantum gates picked from the set of four quantum gates the two quantum gates are non-commuting.

Preferably the quantum gate is implemented by a set of two phase retarders e.g. a half-wave plate and a quarter-wave plate. The use of these two waveplate types allows to construct a set that meets the above condition based on operators operating on the polarization state of photons.

It turns out that this is not possible in the basis of only linear polarizations for two photons. FIG. 2 shows a more advanced embodiment of the present invention, which is an extension of the embodiment shown in FIG. 1. Specifically, the quantum device 26 comprises one quarter-wave plate (QWP) 27 in addition to the HWP 7, wherein the QWP 27 is arranged in the light path of the received photon after the HWP 7. The QWP 27 introduces one additional degree of freedom for the input-encoding scheme, represented by the angle δ of rotation of the QWP 27 and manifesting itself in a component of elliptical polarization of the photons. Accordingly, the input-encoding unit 4 is connected to both waveplates 7, 27 in order to control both degrees of freedom of the quantum device 26. Apart from this difference, the general structure of the apparatus 1 for executing the one-time program is similar to the structure described in detail with respect to FIG. 1, wherein the same reference numbers are used for similar components in FIG. 2.

In order to harness the capabilities of the executing/receiving apparatus 1, the sender in this example also controls two degrees of freedom to prepare the quantum state of the photons encoding the instructions of the one-time program. In addition to the sender HWP 21, the preparation unit 28 comprises a sender QWP 29, which is provided in the light path of the photons emitted from the photon source 19 in front of the sender HWP 21; i.e. the order of the sender HWP 21 and QWP 29 is inverse to the order of the receiver HWP 7 and QWP 27 with respect to the sequence of transmission of the photon. The sender QWP 28 is also connected to the program-encoding unit 22 via the control channel 23 to receive a configuration setting the angle γ of rotation of the QWP 28.

In this instance, a more sophisticated input-encoding scheme may be employed to avoid the above-mentioned weakness when using two photons:

Photon A:

| input values | quantum gate | HWP angle β/2 | QWP angle δ (starting from vertical polarization) |
|---|---|---|---|
| 00 | Z | 0° | 0° |
| 01 | X | 22.5° | 0° |
| 10 | Z | 0° | 0° |
| 11 | X | 22.5° | 0° |

Photon B:

| input values | quantum gate | HWP angle β/2 | QWP angle δ (starting from vertical polarization) |
|---|---|---|---|
| 00 | Z | 0° | 0° |
| 01 | X | 22.5° | 0° |
| 10 | Y | 22.5° | 45° |
| 11 | Y | 22.5° | 45° | where in addition to the definitions in connection with the simple input-encoding scheme above, "Y" denotes a measurement in the Pauli-Y basis, i.e. in the basis with eigenstates $|R\rangle$ and $|L\rangle$ defined as $$|R\rangle = \frac{1}{\sqrt{2}}(|0\rangle + i|1\rangle) \text{ and } |L\rangle = \frac{1}{\sqrt{2}}(|0\rangle - i|1\rangle)$$

respectively.

Regarding the corresponding program-encoding scheme, the possible states encoding the instructions are chosen from the following set:

For Photon A:

$$|\Phi_0^A\rangle = +\cos\left(\frac{\pi}{8}\right)|0\rangle + \sin\left(\frac{\pi}{8}\right)|1\rangle$$

$$|\Phi_1^A\rangle = +\cos\left(\frac{\pi}{8}\right)|0\rangle - \sin\left(\frac{\pi}{8}\right)|1\rangle$$

$$|\Phi_2^A\rangle = +\sin\left(\frac{\pi}{8}\right)|0\rangle + \cos\left(\frac{\pi}{8}\right)|1\rangle$$

$$|\Phi_3^A\rangle = -\sin\left(\frac{\pi}{8}\right)|0\rangle + \cos\left(\frac{\pi}{8}\right)|1\rangle$$

For Photon B:

$$|\Phi_0^B\rangle = \left(+\frac{1}{2} - \frac{1}{\sqrt{2}}i\right)|0\rangle + \frac{1}{2}|1\rangle$$

$$|\Phi_1^B\rangle = \left(-\frac{1}{2} - \frac{1}{\sqrt{2}}i\right)|0\rangle + \frac{1}{2}|1\rangle$$

$$|\Phi_2^B\rangle = \frac{1}{2}|0\rangle + \left(+\frac{1}{2} + \frac{1}{\sqrt{2}}i\right)|1\rangle$$

$$|\Phi_3^B\rangle = \frac{1}{2}|0\rangle + \left(-\frac{1}{2} + \frac{1}{\sqrt{2}}i\right)|1\rangle$$

$$|\Phi_4^B\rangle = \left(+\frac{1}{2} + \frac{1}{\sqrt{2}}i\right)|0\rangle + \frac{1}{2}|1\rangle$$

$$|\Phi_5^B\rangle = \left(-\frac{1}{2} + \frac{1}{\sqrt{2}}i\right)|0\rangle + \frac{1}{2}|1\rangle$$

$$|\Phi_6^B\rangle = \frac{1}{2}|0\rangle + \left(+\frac{1}{2} - \frac{1}{\sqrt{2}}i\right)|1\rangle$$

$$|\Phi_7^B\rangle = \frac{1}{2}|0\rangle + \left(-\frac{1}{2} - \frac{1}{\sqrt{2}}i\right)|1\rangle$$

These states correspond to the following waveplate settings:

| | γ = −22.5° | γ = 0.0° | γ = 22.5° |
|---|---|---|---|
| α/2 = 0.00° | $|\Phi_7^B\rangle$ | | $|\Phi_2^B\rangle$ |
| α/2 = 11.25° | | $|\Phi_3^A\rangle$ | |

-continued

| | γ = −22.5° | γ = 0.0° | γ = 22.5° |
|---|---|---|---|
| α/2 = 22.50° | $|\Phi_5^B\rangle$ | | $|\Phi_3^B\rangle$ |
| α/2 = 33.75° | | $|\Phi_1^A\rangle$ | |
| α/2 = 45.00° | $|\Phi_4^B\rangle$ | | $|\Phi_1^B\rangle$ |
| α/2 = 56.25° | | $|\Phi_0^A\rangle$ | |
| α/2 = 67.50° | $|\Phi_6^B\rangle$ | | $|\Phi_0^B\rangle$ |
| α/2 = 78.75° | | $|\Phi_2^A\rangle$ | |

Based on this set, the program-encoding scheme is provided below. For clarity, the instructions are denoted by their respective output map of all four possible input values (00, 01, 10 and 11). For instance the instruction "logical AND" maps the input values 00, 01 and 10 to the output value 0 and the input value 11 to the output value 1. Therefore this instruction is denoted as "0001". For each instruction there are two possible encodings/states (a) and (b). In practice, one of the two possible encodings/states (a) or (b) is chosen randomly for each instruction (i.e. for both photons A and B encoding the instruction) to improve security.

Photon A:

| instruction | quantum state | HWP angle α/2 | QWP angle γ |
|---|---|---|---|
| 0000 (a) | $|\Phi_0^A\rangle$ | 56.25° | 0° |
| 0000 (b) | $|\Phi_3^A\rangle$ | 11.25° | 0° |
| 0001 (a) | $|\Phi_0^A\rangle$ | 56.25° | 0° |
| 0001 (b) | $|\Phi_3^A\rangle$ | 11.25° | 0° |
| 0010 (a) | $|\Phi_0^A\rangle$ | 56.25° | 0° |
| 0010 (b) | $|\Phi_3^A\rangle$ | 11.25° | 0° |
| 0011 (a) | $|\Phi_0^A\rangle$ | 56.25° | 0° |
| 0011 (b) | $|\Phi_3^A\rangle$ | 11.25° | 0° |
| 0100 (a) | $|\Phi_1^A\rangle$ | 33.75° | 0° |
| 0100 (b) | $|\Phi_2^A\rangle$ | 78.75° | 0° |
| 0101 (a) | $|\Phi_1^A\rangle$ | 33.75° | 0° |
| 0101 (b) | $|\Phi_2^A\rangle$ | 78.75° | 0° |
| 0110 (a) | $|\Phi_1^A\rangle$ | 33.75° | 0° |
| 0110 (b) | $|\Phi_2^A\rangle$ | 78.75° | 0° |
| 0111 (a) | $|\Phi_1^A\rangle$ | 33.75° | 0° |
| 0111 (b) | $|\Phi_2^A\rangle$ | 78.75° | 0° |
| 1000 (a) | $|\Phi_2^A\rangle$ | 78.75° | 0° |
| 1000 (b) | $|\Phi_1^A\rangle$ | 33.75° | 0° |
| 1001 (a) | $|\Phi_2^A\rangle$ | 78.75° | 0° |
| 1001 (b) | $|\Phi_1^A\rangle$ | 33.75° | 0° |
| 1010 (a) | $|\Phi_2^A\rangle$ | 78.75° | 0° |
| 1010 (b) | $|\Phi_1^A\rangle$ | 33.75° | 0° |
| 1011 (a) | $|\Phi_2^A\rangle$ | 78.75° | 0° |
| 1011 (b) | $|\Phi_1^A\rangle$ | 33.75° | 0° |
| 1100 (a) | $|\Phi_3^A\rangle$ | 11.25° | 0° |
| 1100 (b) | $|\Phi_0^A\rangle$ | 56.25° | 0° |
| 1101 (a) | $|\Phi_3^A\rangle$ | 11.25° | 0° |
| 1101 (b) | $|\Phi_0^A\rangle$ | 56.25° | 0° |
| 1110 (a) | $|\Phi_3^A\rangle$ | 11.25° | 0° |
| 1110 (b) | $|\Phi_0^A\rangle$ | 56.25° | 0° |
| 1111 (a) | $|\Phi_3^A\rangle$ | 11.25° | 0° |
| 1111 (b) | $|\Phi_0^A\rangle$ | 56.25° | 0° |

Photon B:

| instruction | quantum state | HWP angle α/2 | QWP angle γ |
|---|---|---|---|
| 0000 (a) | $|\Phi_0^B\rangle$ | 67.5° | 22.5° |
| 0000 (b) | $|\Phi_4^B\rangle$ | 45° | −22.5° |
| 0001 (a) | $|\Phi_1^B\rangle$ | 45° | 22.5° |
| 0001 (b) | $|\Phi_5^B\rangle$ | 22.5° | −22.5° |
| 0010 (a) | $|\Phi_2^B\rangle$ | 0° | 22.5° |
| 0010 (b) | $|\Phi_6^B\rangle$ | 67.5° | −22.5° |
| 0011 (a) | $|\Phi_3^B\rangle$ | 22.5° | 22.5° |
| 0011 (b) | $|\Phi_7^B\rangle$ | 0° | −22.5° |
| 0100 (a) | $|\Phi_0^B\rangle$ | 67.5° | 22.5° |
| 0100 (b) | $|\Phi_4^B\rangle$ | 45° | −22.5° |
| 0101 (a) | $|\Phi_1^B\rangle$ | 45° | 22.5° |
| 0101 (b) | $|\Phi_5^B\rangle$ | 22.5° | −22.5° |
| 0110 (a) | $|\Phi_2^B\rangle$ | 0° | 22.5° |
| 0110 (b) | $|\Phi_6^B\rangle$ | 67.5° | −22.5° |
| 0111 (a) | $|\Phi_3^B\rangle$ | 22.5° | 22.5° |
| 0111 (b) | $|\Phi_7^B\rangle$ | 0° | −22.5° |
| 1000 (a) | $|\Phi_0^B\rangle$ | 67.5° | 22.5° |
| 1000 (b) | $|\Phi_4^B\rangle$ | 45° | −22.5° |
| 1001 (a) | $|\Phi_1^B\rangle$ | 45° | 22.5° |
| 1001 (b) | $|\Phi_5^B\rangle$ | 22.5° | −22.5° |
| 1010 (a) | $|\Phi_2^B\rangle$ | 0° | 22.5° |
| 1010 (b) | $|\Phi_6^B\rangle$ | 67.5° | −22.5° |
| 1011 (a) | $|\Phi_3^B\rangle$ | 22.5° | 22.5° |
| 1011 (b) | $|\Phi_7^B\rangle$ | 0° | −22.5° |
| 1100 (a) | $|\Phi_0^B\rangle$ | 67.5° | 22.5° |
| 1100 (b) | $|\Phi_4^B\rangle$ | 45° | −22.5° |
| 1101 (a) | $|\Phi_1^B\rangle$ | 45° | 22.5° |
| 1101 (b) | $|\Phi_5^B\rangle$ | 22.5° | −22.5° |
| 1110 (a) | $|\Phi_2^B\rangle$ | 0° | 22.5° |
| 1110 (b) | $|\Phi_6^B\rangle$ | 67.5° | −22.5° |
| 1111 (a) | $|\Phi_3^B\rangle$ | 22.5° | 22.5° |
| 1111 (b) | $|\Phi_7^B\rangle$ | 0° | −22.5° |

Figure 3:
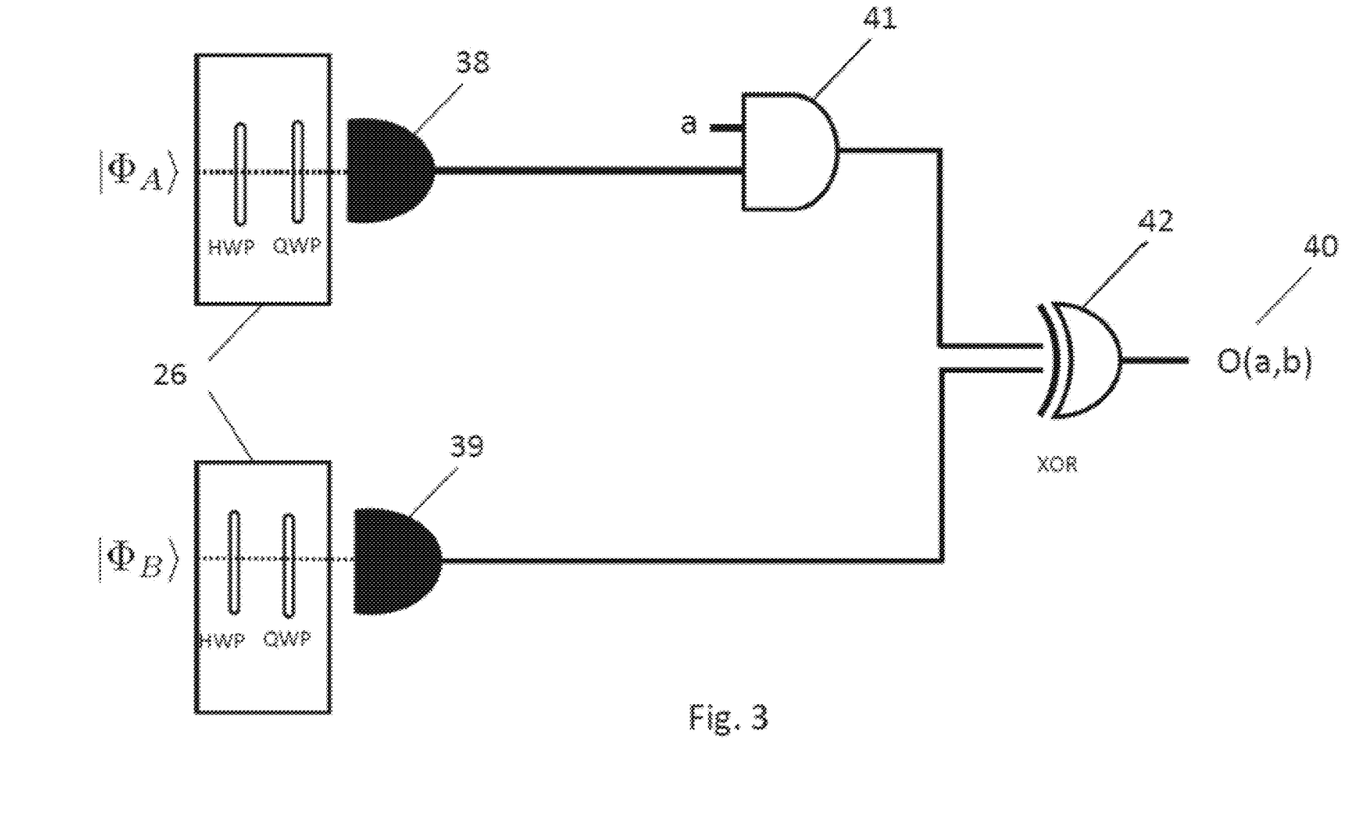
FIG. 3 shows a block diagram of a simple post-processing scheme for the second embodiment according to FIG. 2.

The basic output-decoding scheme corresponding to the above encoding schemes is schematically illustrated by the post-processing scheme shown in FIG. 3. To evaluate the output value of the present instruction, the measurements of the resulting states of both photons have to be combined. In FIG. 3 the two photons A and B are represented by their respective quantum state functions $\phi_i^A\rangle$ and $\phi_j^B\rangle$, where i=0 . . . 3 and j=0 . . . 7 according to the above tables. In the present embodiment the photons A, B pass through the quantum device 28 and their resulting state is measured by the measurement unit at different times. The measurement outputs 38, 39 of the measurement unit 8 are schematically indicated as bit stream sources. In FIG. 3, the further processing of the present instruction from the two measurement outputs 38, 39 to obtain the output 40 is illustrated by a simplified Hardware Description Language notation of the applied logic gates. The measurement output 38 obtained from the first photon A is combined in a logical AND gate 41 with the first input value a. The result of the logical AND gate 41 is then combined in a logical XOR (exclusive or) gate 42 with the measurement output 39 obtained from the second photon B. Then the result of the logical XOR gate 42 is the output value of the instruction encoded by the photons A, B with the input values a, b, wherein the configuration of the quantum device 26 upon receipt of the photons A, B has been chosen according to the above input-encoding scheme and based on the input values a, b.

Figure 4:
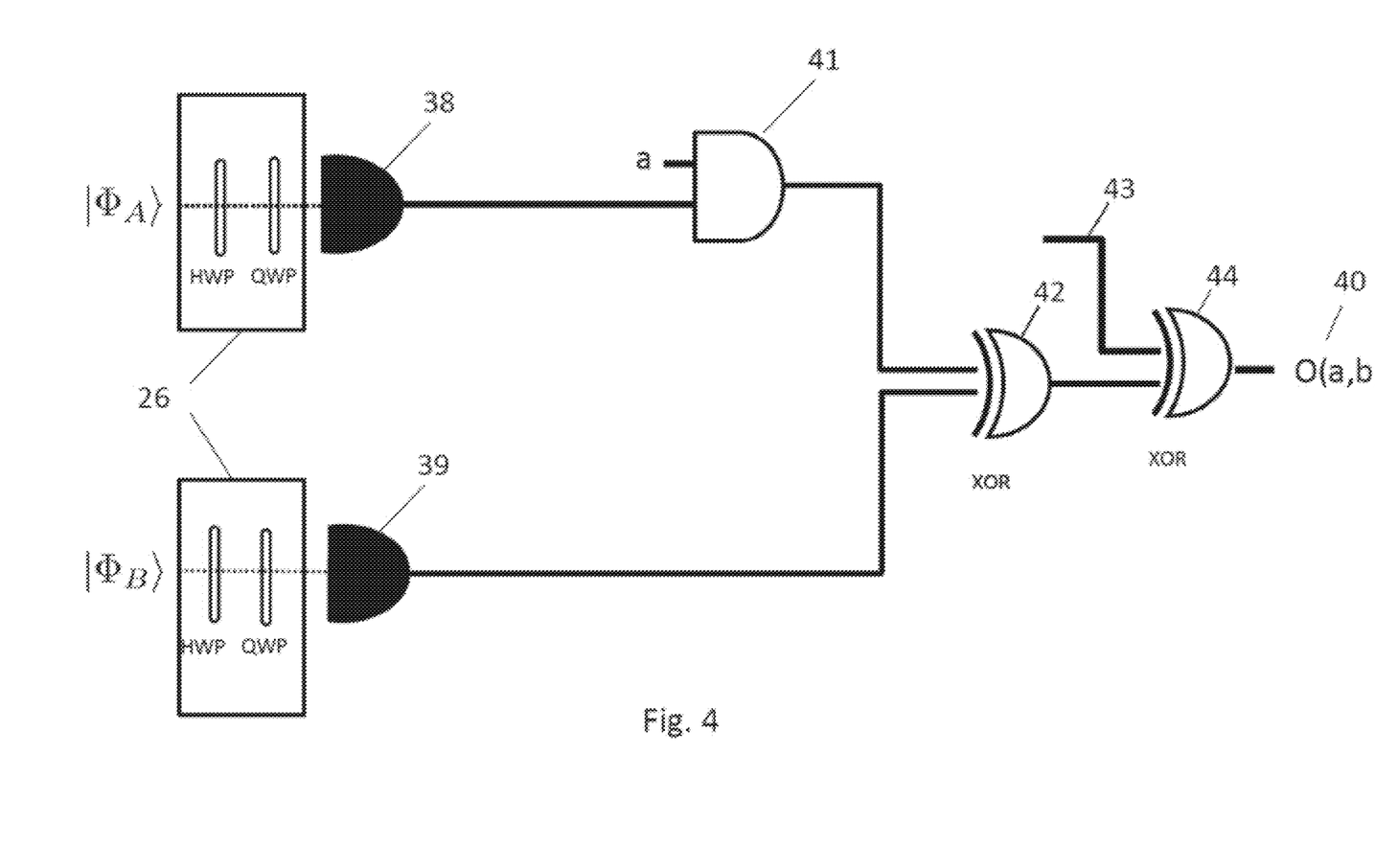
FIG. 4 shows a block diagram of an improved post-processing scheme for the second embodiment according to FIG. 2.

The post-processing scheme (or output-decoding scheme) shown in FIG. 4 is an extension of the scheme described above in connection with FIG. 3. In addition to the previous scheme, the result of the logical XOR gate 42 is combined with a flip bit 43 in a second logical XOR gate 44 and the output value of the instruction encoded by the photons A, B with the input values a, b is the result of the second logical XOR gate 44. The value of the flip bit is provided by the provider of the one-time program in addition to the prepared elementary quantum systems and over a classical channel, e.g. electronically. This modification has been introduced to mitigate a "re-send attack" that could otherwise be performed by the user/receiver. A dishonest user might exploit the fact that in practical systems the loss of single photons cannot be completely avoided and therefore a mechanism must be foreseen to ask the program provider to re-send an instruction that has not been received by the user (e.g. none of the detectors 16, 17 triggered within the accepted timeframe for receiving the single photon). If a dishonest user pretends to not have received a photon, although they did receive it, and the sender re-sends an identically prepared photon, the user can use the copy to help the reconstruction of the one-time program (i.e. one additional copy does not allow complete reconstruction but does allow tomography). By using the post-processing scheme of FIG. 4, such misuse can be effectively prevented in that the provider only sends the value of the flip bit associated with the present instruction if and only if the user confirms safe receipt of each photon of the present instruction. If only one photon is lost, just this photon will be resent and not (necessarily) the whole instruction (which may be encoded onto more than one photon). For the re-sends or retries, the provider can randomly change the encoding of the instruction according to each of the two possible values of the flip bit.

As an additional security measure, the instructions of the program to be provided as a one-time program can be garbled by placing pairs of logical NOT gates between the 2-bit gates forming the instructions of the program. Each of the introduced NOT gates is absorbed into the adjacent 2-bit gate, i.e. into the previous or subsequent 2-bit gate, respectively, thus altering the identity of the 2-bit gates. They can be inserted at several random locations and thereby further complicate the reconstruction of the one-time program from the provided quantum states. This is beneficial because it allows to construct several versions of the same program which are composed from different instructions and therefore, different elementary quantum system states. In a scenario where the same program might be sent out several times, e.g. to different clients, this ensures that practically no identical representation of the same program will be sent out and therefore an unwanted leakage of information is reduced.

To further improve the security and make different programs indistinguishable from each other, optionally the freedom to choose different instructions having the same output can be used to implement the one-time program in such a way that the a priori probability for a given state representing one instruction is uniform.

As each transmission is noisy, error correction may be performed throughout the process. This is because the single bit gates work with approximately 0.85 probability of success and the 2 bit gates work with 0.75 probability of success. Error correction is achieved by breaking the program up into sections of instructions, sending several copies of each section, with the receiver taking the majority output of each section (i.e. effectively a majority voting algorithm) as the input into the next section. Within each section, the instructions may be garbled differently, however all should have the same output if no errors occur. Although this way some information of the program could be leaked to the receiver if some optimal measurement strategy is found and used (they don't act honestly in applying inputs), not all information about the program is obtainable unless an infinite amount of copies are sent.

Figure 5:
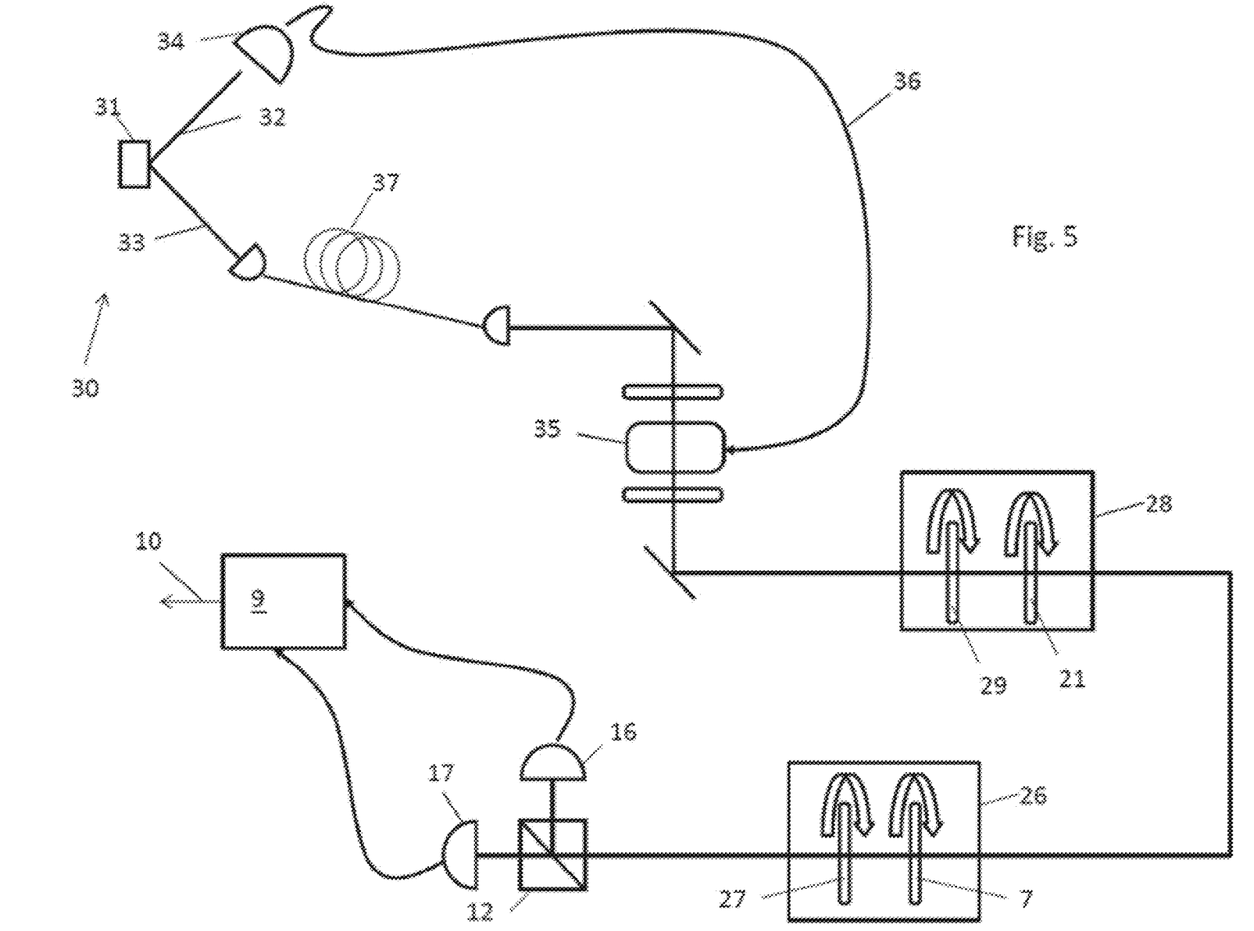
FIG. 5 schematically shows a more detailed structure of the second embodiment according to FIG. 2.

FIG. 5 shows another embodiment of the present invention. In particular, a preferred structure of the photon source 30 emitting single photons used for the preparation of the quantum states encoding the instructions of the one-time program is shown in more detail. The photon source 30 comprises a SPDC photon source 31 emitting two identically polarized photons 32, 33. One of the photons 32, 33 is used as heralding photon 32 and detected by a detector 34. The other photon is used to "carry" an instruction of the one-time program and may thus be termed "carrier photon" 33. The detector 34 is connected over a trigger line 36 to a switch 35, e.g. a Pockels cell, which is temporarily opened to let the carrier photon 33 pass. In order to allow the trigger electronics and the switch 35 a lead, i.e. and a certain preparation time, the carrier photon 33 is sent over a delay line 37, e.g. an optical fibre.

The construction of the photon source 30 helps to minimize the probability of the transmission of two carrier photons passing the same configuration of the preparation unit 28 (cf. FIG. 2) and thus having the same quantum state. Such a double transmission would result in a weakness of the present method, because two different measurements could theoretically be performed on the two photons, divulging more information than necessary about the instruction. In FIG. 3 the input-encoding unit and the program-encoding unit are not shown for simplicity and it is referred to the description of FIG. 2 regarding the control of the phase retarders in form of the waveplates 7, 21, 27 and 29.

In a preferred embodiment, the wavelength of the photons is chosen such that a wavelength filter can be used to avoid interference with or perturbations from ambient light. For example a wavelength of the carrier photons between 750 nm and 850 nm, preferably between 780 nm and 800 nm, may be used together with a cut-on filter at a wavelength sufficiently below the photon wavelength, e.g. 10-100 nm, preferably 30-50 nm, below the photon wavelength. In another example a wavelength of the carrier photons between 1500 nm and 1600 nm, preferably between 1540 nm and 1560 nm, may be used together with a cut-on filter as defined above.

The time frame during which the switch 35 is opened for transmission of a photon should be adapted to the dead time of the detectors 16, 17, i.e. below said dead time. This can be advantageous in the case where this dead time is (approximately) known to the encoder (who controls the switch) because even if a second photon should be transmitted through the switch 35, it could not be detected by the same detector as the first photon because of the dead time of the detector 16/17, thus it reduces accidental information leakage to a passive receiver. At the same time it should be large enough to achieve a stable operation and a reliable transmission of the carrier photon. Too large time frames increase the probability of two consecutive photons, with the resulting information leak. In practice a time window of below 100 ns, preferably between 1 and 80 ns, especially between 5 and 60 ns, is used.

From the above embodiments a person skilled in the art (i.e. who is also familiar with quantum mechanics) will recognize that the invention is applicable to any two-level quantum system, for instance but not restricted to atoms, artificial atoms, ions and superconducting circuits, in a similar manner as demonstrated above for photons. Such systems may require quantum memory and/or face challenges in transferring the quantum state, for example but not restricted to from the sender to the receiver. For applications involving such a transfer, photons are the preferred choice of elementary quantum systems.

The invention claimed is:

1. A method, executed by one or more hardware processors, for executing a one-time program comprising at least one instruction operating on at least one input value (a, b) and returning at least one output value (O), each instruction of the one-time program comprising:

providing by a program sending device at least one elementary quantum system in a pre-defined state;

encoding by the program sending device at least one instruction of a classical program onto the pre-defined state of the at least one elementary quantum system according to a pre-defined program-encoding scheme;

transmitting, by the one or more hardware processors, a resulting state of the at least one elementary quantum system via a computer network from the program sending device to a program receiving device, wherein the program receiving device is separate from the program sending device for execution;

receiving by the program receiving device, via the computer network the at least one elementary quantum system, wherein the resulting state of the at least one elementary quantum system represents the at least one instruction according to the pre-defined program-encoding scheme;

encoding by the program receiving device the at least one input value (a, b) onto a quantum gate according to a pre-defined input-encoding scheme;

applying the quantum gate to the at least one elementary quantum system;

making a measurement of the resulting state of the at least one elementary quantum system after the quantum gate; and determining the at least one output value (O) from a result of the measurement.

2. The method according to claim 1, wherein the at least one elementary quantum system is at least one ensemble of weakly coherent photons or at least one single photon (A, B).

3. The method according to claim 2, wherein the pre-defined state and the resulting state are states in one or more degrees of freedom including polarization, spatial, temporal and frequency.

4. The method according to claim 2, wherein the encoding comprises modifying at least one member selected from a group consisting of: polarization characteristics, spatial characteristics, temporal characteristics, and frequency characteristics, of the at least one ensemble of weakly coherent photons or of the at least one single photon (A, B) provided by the program sending device in a pre-defined state.

5. The method according to claim 2, wherein the quantum gate is implemented by at least one phase retarder, wherein the input-encoding scheme determines a setting of the at least one phase retarder corresponding to the at least one input value (a, b).

6. The method according to claim 1, wherein the one-time program comprises at least two instructions, wherein the method further comprises executing the one-time program sequentially.

7. The method according to claim 6, wherein the method further comprises encoding the at least one input value (a, b) of a second instruction onto the quantum gate after determining the at least one output value (O) of a first instruction.

8. The method according to claim 7, wherein the at least one input value (a, b) of the second instruction depends on the at least one output value (O) of the first instruction.

9. The method according to claim 1, wherein each instruction is represented by at least two elementary quantum systems.

10. The method according to claim 9, wherein the at least one output value (O) is determined from the result of the measurement of the resulting states of the at least two elementary quantum systems using at least one logical exclusive-or gate or at least one logical exclusive-not-or gate, together with one or more of the at least one input value (a, b).

11. The method according to claim 10, wherein the quantum gate is chosen from a set of quantum gates defined such that, for each possible pair of quantum gates picked from the set, two quantum gates of the pair are non-commuting.

12. The method according to claim 11, wherein the quantum gate is formed by a half-wave plate and a quarter-wave plate.

13. The method according to claim 1, wherein determining the at least one output value (O) from a result of the measurement comprises modifying the result depending on a clearance value received over a classical channel after confirming safe reception of the at least one elementary quantum system.

14. The method according to claim 1, wherein the at least one instruction is encoded onto two or more elementary quantum systems, wherein during encoding each elementary quantum system is manipulated separately and contributes only a specific partial representation of the at least one instruction.

15. The method according to claim 1, further comprising preparing the one-time program based on the classical program comprising at least two instructions, wherein following a sequence of the at least two instructions in the classical program and encoding each instruction sequentially.

16. The method according to claim 1, wherein, after transmission of a first elementary quantum system, preparing encoding of a second elementary quantum system.

17. The method according to claim 16, wherein the first elementary quantum system and the second elementary quantum system are ensembles of weakly coherent photons or single photons (A, B).

18. The method according to claim 17, wherein the ensembles of weakly coherent photons or the single photons (A, B) are provided having a pre-determined polarization, spatial, temporal and/or frequency state, and the at least one instruction of the classical program is encoded on the pre-determined polarization, spatial, temporal and/or frequency state of the ensembles of weakly coherent photons or of the single photons (A, B).

19. The method according to claim 1, wherein a clearance value is randomly generated, the encoding of the at least one instruction of the classical program onto the resulting state of the at least one elementary quantum system being modified according to the clearance value, the clearance value being transmitted only after safe reception of the at least one elementary quantum system for execution has been confirmed.

20. A system, executed by one or more hardware processors, for executing a one-time program comprising at least one instruction operating on at least one input value (a, b) and returning at least one output value (O), comprising:

a sender device, comprising:

a photon source configured to emit at least one single photon or at least one ensemble of weakly coherent photons, forming at least one elementary quantum system respectively having a predetermined state; and a preparation unit configured to prepare the predetermined state of the at least one elementary quantum system emitted by the photon source; and a program encoding unit configured to control the preparation unit depending on at least one instruction of a provided classical program using a predefined program-encoding scheme, wherein the photon source and the preparation unit are connected to the program encoding unit; and a receiver device for receiving the at least one elementary quantum system representing the at least one instruction of the provided classical program according to the pre-defined program-encoding scheme;

an input encoder configured to encode the at least one input value (a, b) onto a quantum gate according to a pre-defined input-encoding scheme;

a quantum device configured to apply the quantum gate to the at least one elementary quantum system, the quantum device connected to the input encoder;

a measurement unit configured to make a measurement of a resulting state of the at least one elementary quantum system exiting the quantum device; and a hardware post-processor connected to the measurement unit and configured to determine the at least one output value (O) from a result of the measurement, wherein the preparation unit, the program encoding unit, the receiver device, the input encoder, the quantum device, and the measurement unit are being implemented by one or more processors.

21. The system according to claim 20, wherein the measurement unit or the hardware post-processor is connected to the input encoder over an internal trigger channel and configured to notify the input encoder of reception of the at least one elementary quantum system or the at least one instruction.

22. The system according to claim 20, wherein the quantum device comprises at least one configurable phase retarder connected to the input encoder, such that setting of the phase retarder is controlled depending on the at least one input value (a, b), the measurement unit comprising at least one detector capable of detecting a single photon.

23. The system according to claim 20, wherein the program encoding unit is configured to receive a notification of the at least one single photon emitted by the photon source and to proceed to a next instruction of the provided classical program upon reception of the notification.

* * * * *